W. J. PUCKETT.
CRATE.
APPLICATION FILED APR. 29, 1909.
943,565.
Patented Dec. 14, 1909.
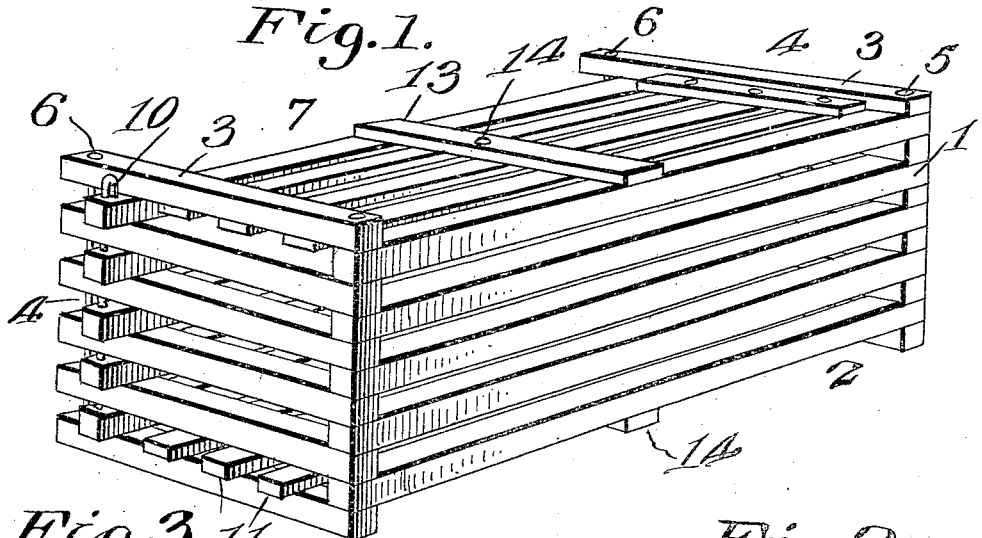
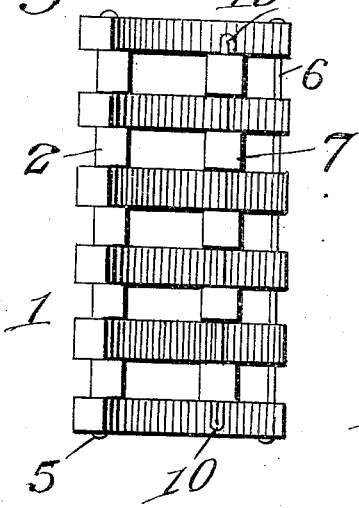
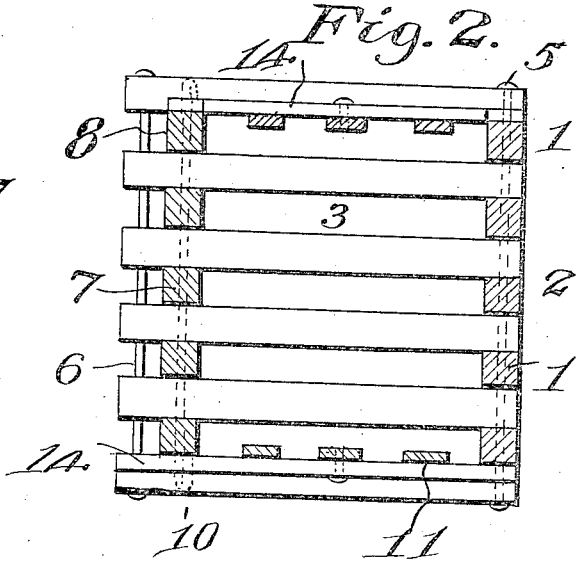
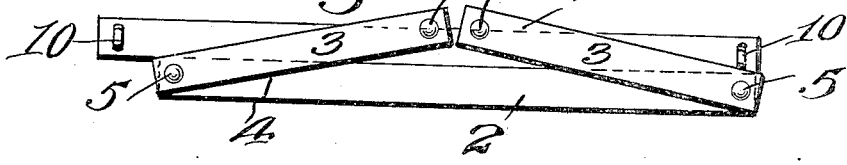
Witnesses:
Joe. P. Wahler
J. W. Garner
Inventor
William J. Puckett
By Victor J. Evans.
Attorney

UNITED STATES PATENT OFFICE.

WILLIAM J. PUCKETT, OF MANCELONA, MICHIGAN, ASSIGNOR OF ONE-HALF TO FREDERICK WALDIE, OF MANCELONA, MICHIGAN.

CRATE.

943,565. Specification of Letters Patent. Patented Dec. 14, 1909.

Application filed April 29, 1909. Serial No. 492,931.

*To all whom it may concern:*

Be it known that I, WILLIAM J. PUCKETT, a citizen of the United States, residing at Mancelona, in the county of Antrim and State of Michigan, have invented new and useful Improvements in Crates, of which the following is a specification.

This invention is an improved box, crate or other like structure adapted to be folded compactly so as to occupy but little space when emptied and hence facilitate the packing and shipping thereof, and the said invention consists in the construction, combination and arrangement of devices hereinafter described and claimed.

In the accompany drawings:—Figure 1 is a perspective view of a crate constructed in accordance with this invention. Fig. 2 is a transverse sectional view of the same. Fig. 3 is an end elevation of the same partially folded. Fig. 4 is a plan showing the walls of the crate folded together.

Each wall of my improved crate is composed of spaced slats, the slats 1 of one of the side walls which I will call a fixed side wall 2 are interposed at their ends between the corresponding ends of the slats 3 of the end walls 4 and the said end walls are pivoted to the said fixed side wall by pivot rods 5 which pass through openings in the alternately placed overlapping ends of the slats of the fixed wall and end walls, and hence said end walls are adapted to extend through said fixed side walls at right angles thereto as shown in Figs. 1 and 2 and are also adapted to be folded closely against said fixed end wall as shown in Fig. 4. The free ends of the slats of the end walls are connected together by stop elements 6 which are here shown as rods which pass through openings in said slats. The side wall 7 of the slat which is opposite the side wall 2 thereof has its slats 8, which are interposed between the slats 3 of the end walls connected together at their ends at points on the outer sides of said side walls by stop elements which are here shown as rods 10. The slats of the said movable side wall 7 are slidable between those of the pivoted end walls and hence the said side wall 7 may be moved toward and from the fixed side wall 2 and when bearing against said fixed wall 2 as shown in Fig. 4, the said pivoted end walls may be moved toward each other and disposed compactly as shown so that the four walls of the crate or other structure occupy very little space and may be readily stored or shipped.

The bottom and top of the crate are composed of longitudinal slats 11 and connecting cross slats 12 near the ends of said slats 11, the ends of the said bottom and top being adapted to be interposed between the top and bottom slats of the end walls and the slats of the end walls which are contiguous to said top and bottom slats and the top and bottom are each provided with a locking bar 13 pivoted thereon as at 14 which locking bars when the top and bottom have been put in place may be turned at right angles so that the ends of said locking bars bear on the upper and lower slats of the fixed and movable side walls and thereby secure said top and bottom in place.

I do not desire to limit myself to the precise construction herein shown and described and it is evident that modifications may be made therein within the scope of the appended claims.

What is claimed is:—

1. A structure of the class described, comprising a fixed side wall and end walls each composed of a series of slats, those of the end walls alternating with those of the fixed side wall, so that spaces are formed between the slats, rods extending through the ends of the fixed side wall slats and also through the corresponding ends of the end wall slats forming pivot connections between the said fixed side wall and said end walls, rods connecting the outer ends of the spaced slats of the end walls and forming stops, and a movable side wall formed of slats disposed in the spaces between the slats of the pivoted end walls and rods connecting the ends of the spaced slats of said movable side wall and also forming stops.

2. A structure of the class described, comprising a fixed side wall and end walls each composed of a series of slats, those of the end walls alternating with those of the fixed side wall, so that spaces are formed between the slats, rods extending through the ends of the fixed side wall slats and also through the corresponding ends of the end wall slats forming pivot connections between the said fixed side wall and said end walls, rods connecting the outer ends of the spaced slats of the end walls and forming stops, and a movable side wall formed of slats disposed in the spaces between the slats of the pivoted end walls and rods connecting the ends of the spaced slats of said movable side wall and also forming stops, and a bottom for insertion between the side and end walls and adapted to bear on the bottom slats of said end walls, said cover provided with a pivoted locking bar adapted to be turned into and out of engagement with the bottom slats of the side walls.

In testimony whereof I affix my signature in presence of two witnesses.

WILLIAM J. PUCKETT.

Witnesses:
JAMES E. SHAW,
JAMES W. DAVIS.